May 13, 1941.   R. Y. CASE   2,241,979
POWER BELT MEASURING DEVICE
Filed Oct. 3, 1939   2 Sheets-Sheet 1
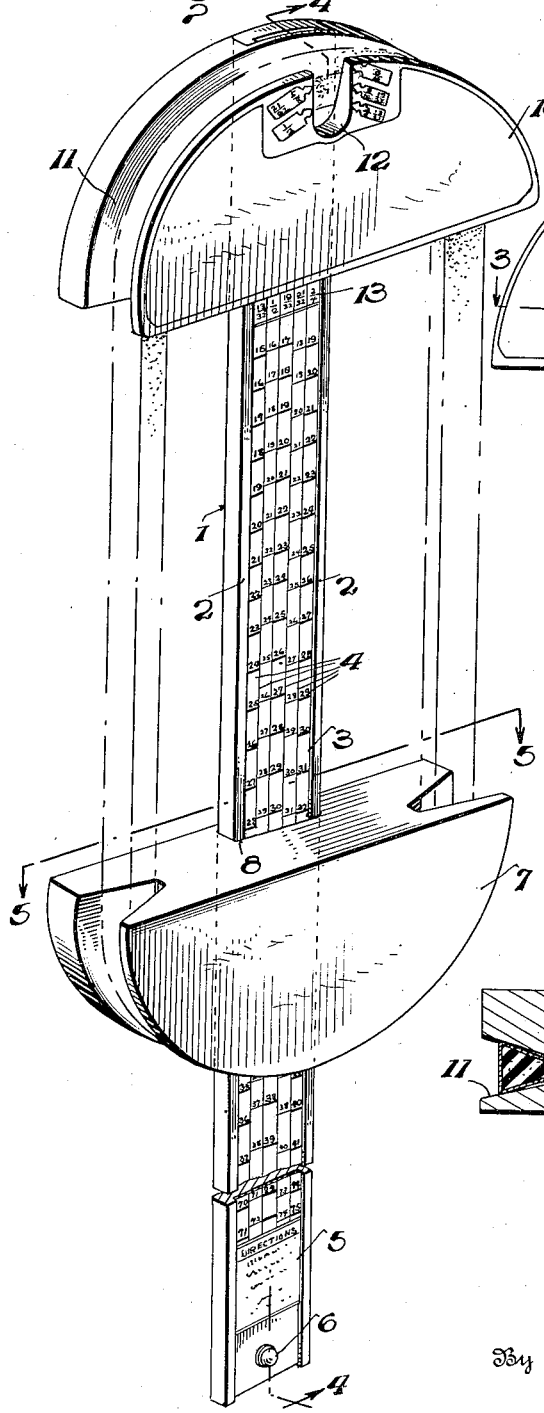
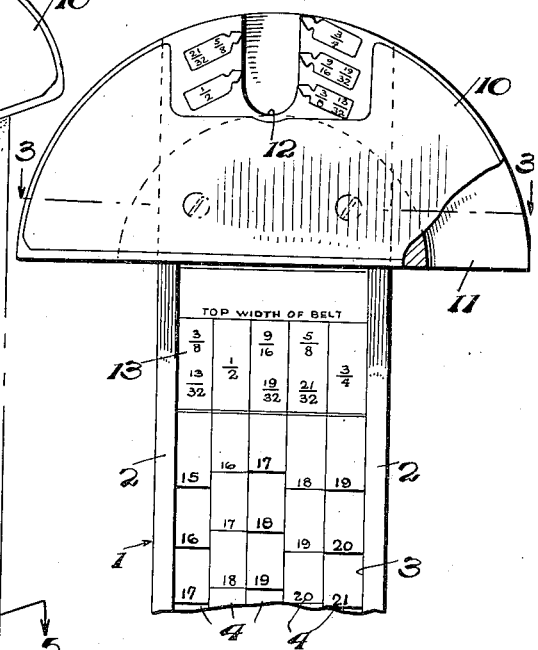
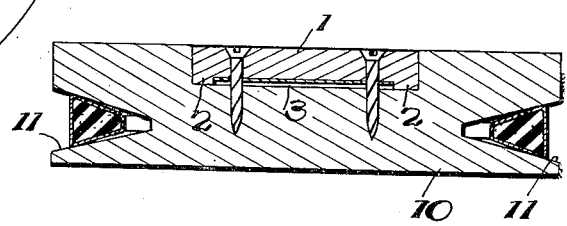
Inventor
Richard Y. Case
By [signature]
Attorney May 13, 1941.  R. Y. CASE  2,241,979
POWER BELT MEASURING DEVICE
Filed Oct. 3, 1939  2 Sheets-Sheet 2
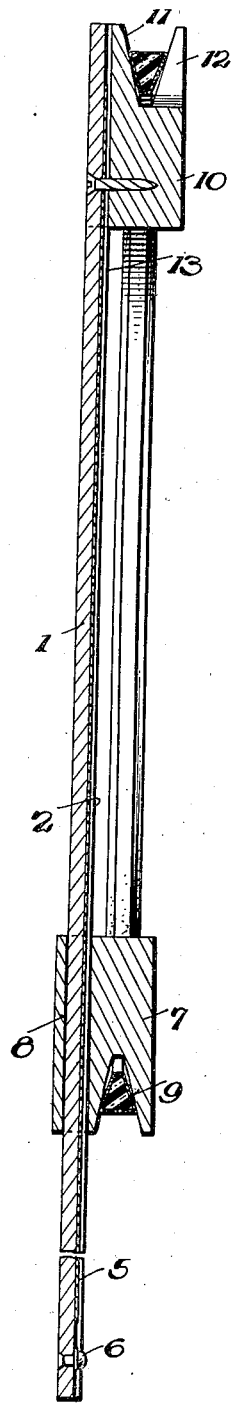
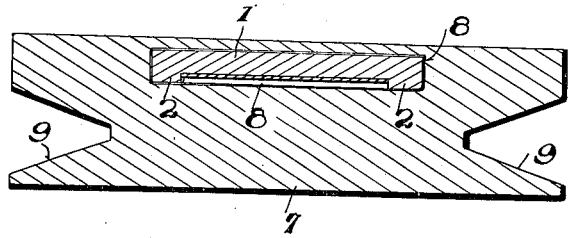
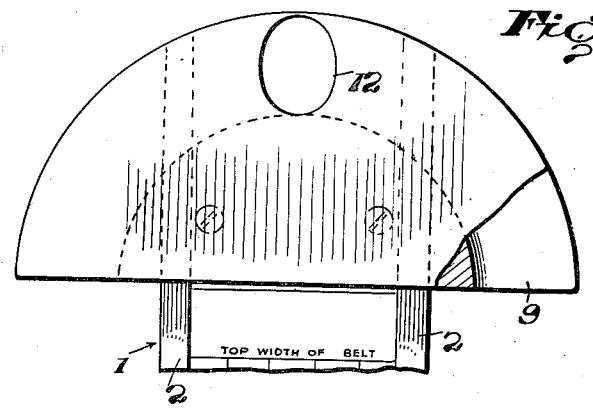
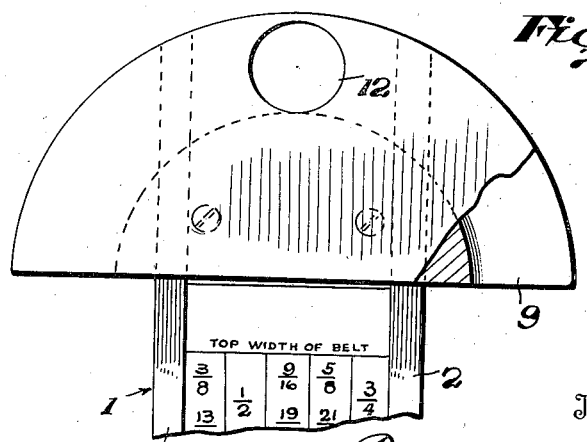
Inventor
Richard Y. Case
By [signature]
Attorney Patented May 13, 1941

2,241,979

UNITED STATES PATENT OFFICE 2,241,979

POWER BELT MEASURING DEVICE

Richard Y. Case, Philadelphia, Pa., assignor to L. H. Gilmer Co., Tacony, Philadelphia, Pa., a corporation of New Jersey Application October 3, 1939, Serial No. 297,746

3 Claims. (Cl. 33—125)

The primary object of my invention is to provide a measuring device for power transmission V-belts to accurately determine the nominal width across the top or outer peripheral surface of the belt, as well as the nominal outside length of the belt, whereby the purchaser of a belt is assured of obtaining a belt of the proper width at the top as well as the length necessary for his purpose.

It is important in the so-called V-shaped belt to have the proper width at the top to secure the desired traction and prevent the inner surface or bottom of the belt from sinking too far in the sheave groove and engaging the bottom of the sheave groove on which it is mounted, because V-shaped belts are designed to drive through its side walls or faces. Therefore, if such a belt engages the bottom of the groove of the sheave effectiveness of the power drive of a V-belt is materially reduced, if not lost; and with these and other objects in view my invention consists of the parts and combination of parts hereinafter set forth.

In the drawing:

Figure 1 is a perspective view of a power belt measuring device embodying my invention.

Figure 2 is a detail enlarged view of the top portion of the device.

Figure 3 is a section on the line 3—3, Figure 2, looking in the direction of the arrow.

Figure 4 is a vertical section on the line 4—4, Figure 1.

Figure 5 is an enlarged detail sectional view on the line 5—5, Figure 1, looking in the direction of the arrow.

Figures 6 and 7 are detail views showing a slight modification.

The reference numeral 1 designates a base or scale member having ribs 2 at each edge, whereby the top surface of the base is depressed or lies in a lower plane than the top plane of the ribs 2, the object of which will be hereinafter pointed out.

The depressed surface 3 of the base is divided into five columns 4, in each of which columns are arranged a vertical row of numerals which are used to determine the length of the belt, as will be hereinafter explained.

At the bottom of the face of the base there is a space 5 in which is placed the directions for the use of the device, and below this space is a stop 6 to be hereinafter referred to.

A semi-circular belt length measuring member 7 is provided with a slot 8 and is slidably mounted on the base 1; the extreme outward movement of the slide 7 is limited by the stop 6 which projects above the side ribs 2 of the base. The slide 7 has its arcuate outer face provided with a master groove 9 for V-belts, the angle of which is preferably slightly more acute than any belt to be measured which enables the user to obtain a true top width measurement.

Rigidly secured to the top end of the base 1 is a head 10 similar in form to the member 7 and having an arcuate outer face provided with a master V-groove 11. The groove 9 in the slide 7 and the groove 11 in the head 10, when the slide 7 is in contact with the head, form a continuous circular groove. The angle of the groove 11 of the head is also slightly more acute than any belt to be measured to obtain a true top width measurement.

One wall of the groove 11 is interrupted by a slot 12 which extends to the bottom of the groove 11. At one side of the slot are designations, such, for instance, $21/32$, $5/8$ and $1/2$ with an arrow extending from each designation to a predetermined point on the side wall of the slot, while at the other side of the slot are designations such as $3/4$, $9/16$, $19/32$, $3/8$, $13/32$, from each of which arrows lead to predetermined points on this side wall of the slot. These designations indicate the width of the belt at its top.

At the top of the base 1 there is a space 13 in which is a table designated "Top width of belt," and in this space in the first column from the left there are designations such, for instance, as $3/8$ and $13/32$; in the next column $1/2$; in the next column $9/16$, $19/32$; the next column $5/8$, $21/32$, and in the last column $3/4$.

It will be understood that instead of the slot 12 in the head I may provide the head with a circular or elongated opening instead of a slot, as shown in the drawings.

In the use of my improved belt measuring device the belt is fitted into the groove in the head 10 in which position the top of the belt is at one of the designations at the side of the slot 12. Then place the belt in the groove of the slide away from the head 7 and move the slide until both sides of the belt are taut. The belt length will then be found on the gage in the column headed by the proper belt width at the point indicated at the flat top edge of the slide 7.

The object of having five columns of gage figures or scales on the base or scale member 1 is to provide means for indicating the outside lengths of V-belts of the different widths indicated by the top width designations arranged at the sides of the observation slot 8. The outside lengths of V-belts vary in belts of different top widths so that a wider belt seated in the groove 11 would have a larger perimeter around the groove and a greater outside length than a narrow belt. The width of the belt seated in the groove having been ascertained the outside length of the belt of that width may be ascertained by engagement of the belt with the groove in the slide 7, adjusting said slide until the belt is taut, as previously explained, and consulting the length numeral in the column having the appropriate width heading and with which numeral the straight edge of the slide 7 acting as an indicating edge registers when the belt is tautened. By this mode of operation of the measuring device and the coaction between the belt width indicating means and the belt outside length indicating means the nominal width and length of a V-belt necessary to fit any set of pulleys may be readily and easily determined. While five width designations and five coacting length indicating columns are shown, sufficient for measuring belts of a group intended for a particular purpose, for example, driving automobile fans or household refrigerator compressors, obviously the number may be varied as desired to cover any desired group or range of belts.

In this specification certain well known trade terms are used which will be readily understood by those versed in the art, namely, "top" or "top width" to designate the outer periphery of the belt or its width, "bottom" to designate the inner periphery of the belt or inner portion of the V-groove of a pulley or sheave, and "outside length" to designate the length of the belt above its central longitudinal line or axis between the extremities of its end portions.

The ribs 2 at each side of the base 1 function as bearing surfaces for the slide 7, thus preventing the slide contacting with the gage or scale numbers in the several columns 4, whereby these gage numbers are not liable to scraping, wearing or damage, as the slide 7 is moved on the base.

As shown in the drawing, it is important that the belt fit into the grooves of the head 10 and slide 7 so that the sides of the belt contact snugly with the side walls of the groove at the time the top or outer surface of the belt alines with the designation indicating the correct width of the belt. The acute angle of the walls of the groove allows the nominal length of a belt of any angle whatsoever to be measured accurately.

What I claim is:

1. A device for determining the top width and outside length of a V-belt suitable for use with a set of pulleys comprising a scale member bearing a plurality of parallel belt length indicating scales each comprising a width indicating heading and a column of length indicating numerals arranged in successive order under such heading, the numerals in the columns being similar in character but varying in their positions in the columns according to length variations in proportion to width variations in V-belts of different sizes, a head fixed to the scale member adjacent the headed ends of the columns and having a partly circular outer surface provided with a V-shaped groove to receive one end of the belt, one of the walls of said groove being provided with an observation opening to expose a portion of the belt seated in the groove and having designations alongside said opening for indicating the width of the outer periphery of the belt according to the depth to which the belt seats in the groove, said indications conforming with those at the heads of the length indicating columns of the scale member, and a movable indicating member similar to the head having a partly circular outer surface provided with a V-shaped groove to receive the other end of the belt, said member being movable on the scale member toward and from the head and having a surface for indicating cooperation with the columns of length indicating numerals on the scale member.

2. A device of the character set forth in claim 1 wherein the head and the movable indicating member are of semi-circular form and provided in their semi-circular outer edges with the V-grooves, and wherein the straight edge of the movable indicating member serves as the indicating surface for cooperation with the columns of belt length numerals.

3. A belt measuring device of the character set forth in claim 1 wherein the angle of the V-grooves in the head and movable indicating member is smaller than the angle of a V-belt to be measured.

RICHARD Y. CASE.